3,345,365
NOVEL 1,2,4-BENZOTHIADIAZINE-1,1-DIOXIDE
DERIVATIVES
John G. Topliss, Bloomfield, Nathan Sperber, North Caldwell, and Alan A. Rubin, West Caldwell, N.J., assignors to Schering Corporation, Bloomfield, N.J., a corporation of New Jersey
No Drawing. Filed Mar. 31, 1964, Ser. No. 356,072
9 Claims. (Cl. 260—243)

This application is a continuation-in-part of each of our copending applications, Ser. No. 83,377, filed on Jan. 18, 1961 and Ser. No. 56,671, filed on Sept. 19, 1960, both now abandoned.

This invention relates to compositions of matter classified in the art of chemistry as substituted benzothiadiazines and to processes for making and using such compositions.

The invention sought to be patented, in its composition aspect, is described as residing in the concept of chemical compounds having a molecular structure in which there is attached, to a 1,2,4-benzothiadiazine-1,1-dioxide nucleus otherwise unsubstituted in the heterocyclic portion of the nucleus, a saturated lower-aliphatic hydrocarbon radical in the 3-position, and, in addition to the 3-position radical there is also attached to the benzenoid moiety of the benzothiadiazine-1,1-dioxide nucleus, at least one substituent selected from the group consisting of chlorine, bromine, trifluoromethyl, and lower alkyl.

It is known to chemists that a 1,2,4-benzothiadiazine-1,1-dioxide may exist in either one or both of two tautomeric forms. In one form the double bond is between the 3- and 4-position atoms, while in the other form the double bond is between the 2- and the 3-position atoms. The inventors contemplate either or both tautomeric structures as within the scope of their invention.

Thus, the physical embodiments of this invention may be considered to be a member selected from the group consisting of compounds of the formula:

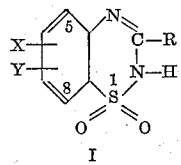

I and the tautomers and non-toxic alkali metal salts thereof, wherein R is a saturated lower aliphatic hydrocarbon; X is a member of the group consisting of halogen and trifluoromethly located at positions of the group consisting of 6 and 7; and Y is a member of the group consisting of hydrogen, halogen, trifluoromethyl and lower alkyl located at one of the unsubstituted positions of the group consisting of positions 6, 7 and 8.

The invention sought to be patented, in its process aspect, is described as residing in the concept of using the tangible embodiment of a composition of matter hereinabove described, by administering to a mammal, including domestic mammals, such as dogs, such compositions as the essential active ingredient of a pharmaceutical formulation.

The tangible embodiments of the composition aspect of the invention possess the inherent general physical properties of being high melting, white crystalline solids; are substantially insoluble in water; are soluble in aqueous alkali from which solutions the alkali metal salts are obtained on evaporation of water; and are soluble in lower aliphatic alcohols. Examination of compounds produced according to the hereinafter described process reveals, upon ultraviolet and infra-red spectographic analysis, spectral data confirming the molecular structure hereinabove set forth. For example, the C=N frequency characteristic of the cyclized nucleus is evident. These aforementioned physical characteristics, taken together with the nature of the starting materials and the mode of synthesis, positively confirm the structure of the compositions sought to be patented.

The tangible embodiments of the invention possess the inherent applied use characteristics of exerting an antihypertensive effect.

As used herein, the term "saturated lower-aliphatic hydrocarbon" means lower alkyl radicals, including the straight and branched-chain radicals, among which are, for purpose of illustration but without limiting the generality of the foregoing, methyl, ethyl, propyl, isopropyl, n-butyl, t-butyl, iso-amyl, and the cyclized lower alkyl radicals cyclopropyl, cyclobutyl and cyclopentyl.

The manner and processes of making the tangible embodiments of the invention will now be generally described so as to enable a person skilled in the art of chemistry to make the same. In general, these processes advantageously employ an appropriately substituted o-sulfamylaniline as a starting material. The sulfamylaniline starting materials can be prepared according to the following general procedure which involves treating a 2-chloro X,Y-disubstituted nitrobenzene (II) with a mixture of thiourea, benzyl chloride, and alkali, yielding the thioether (III) which compound is then sequentially treated with chlorine in aqueous acetic acid, and then with ammonia, to yield the nitrosulfonamide (IV). The nitrosulfonamide is reduced as with iron in ammonium chloride solution, to yield the 2-sulfamyl- X,Y-disubstituted aniline (V). This series of reactions is illustrated as follows:

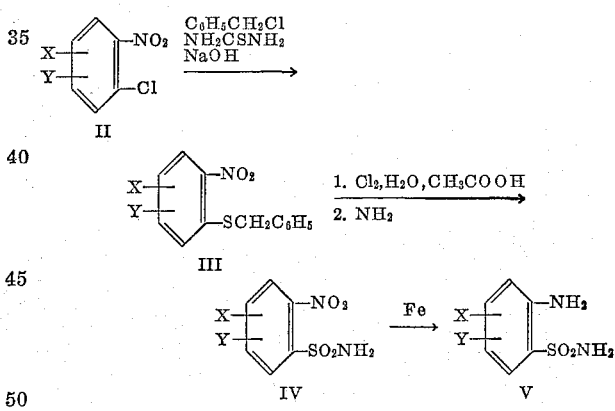

X and Y being the benzenoid substituents referred to in the above passages.

In general, if a particular o-nitrochlorobenzene (II) is not known, it may be prepared by any of the usually well-known procedures.

Each of the above starting materials (V) is useful for conducting the reaction with an ortho ester of a substituted formic acid, said acid of the formula RCOOH, R representing a saturated lower aliphatic hydrocarbon radical. This ortho ester reactant is hereinafter identified by the terms "saturated lower aliphatic hydrocarbon—substituted ortho formic ester" or merely "ortho ester." By such reaction there is produced the substituted 1,2,4-benzothiadiazine-1,1-dioxides of our invention.

The lower aliphatic hydrocarbon substituted orthoformic esters employed as starting materials in conducting our process are generally known or are readily prepared by procedures known to those skilled in the art.

According to one procedure, the physical embodiments of our concept are made by reacting an above described 2-sulfamyl starting material with a saturated lower aliphatic hydrocarbon substituted orthoformic ester bearing the hydrocarbon moiety it is desired to have appear in the 3-position of the composition of the invention. The reaction is generally carried out at above room temperatures. When carried out in the absence of a solvent the temperature range is from about 40° C. to the boiling point of the ortho ester, although a temperature of at least about 80° C. is preferred in order to complete the reaction in a practical time. When the reaction is carried out in the presence of an inert organic solvent, the temperature is generally maintained at about the reflux temperature of the reaction mixture. The reflux reaction is generally continued for several hours until the reaction is complete. The proportion of the reactants may be in equimolar quantities, but, preferably an excess of the ortho ester is used.

Other alternative methods of producing the desired substituted 1,2,4-benzothiadiazine-1,1-dioxide can be employed. Thus, any of the aforementioned 2-sulfamyl ring-substituted anilines can be acylated with a lower aliphatic hydrocarbon carboxylic acid anhydride or a lower aliphatic hydrocarbon carbonyl chloride, to form a 1-(lower aliphatic hydrocarbon carbonyl) amino-2-sulfamyl-benzene, or a 1-(lower aliphatic hydrocarbon carbonyl) amino-2-(lower aliphatic hydrocarbon carbonyl) sulfamyl benzene, which is then cyclized by heating, yielding the substituted 1,2,4-benzothiadiazine-1,1-dioxide. For example, by reacting either acetyl chloride or acetic acid anhydride with 2-sulfamyl-4,5-dichloroaniline, there is produced the intermediate 1-acetylamino-2-sulfamyl-4,5-dichloro-benzene. This intermediate is heat treated at about 200–250° C. to yield 3-methyl-6,7-dichloro-1,2,4-benzothiadiazine-1,1-dioxide. It is to be noted that the mono-acylated intermediate will be produced when the reaction is conducted in a non-polar inert organic solvent, such as aromatic hydrocarbons, ethers, and the like. The di-acylated intermediate will be produced when the reaction is conducted with an excess of the acylating agent in the presence of a tertiary amine such as pyridine, and the like.

The best mode contemplated by the inventors of carrying out their invention will now be set forth as follows:

EXAMPLE 1

*3-methyl-7-chloro-1,2,4-benzothiadiazine-1,1-dioxide*

A.—NN'-diacetylorthanilamide

A mixture containing 10 g. of orthoanilamide, 10 cc. of pyridine and 20 cc. of acetic anhydride is heated for 3 hours at 50–60° C. and allowed to stand overnight. The solids obtained are filtered and crystallized from ethanol to yield 10.73 g. of NN'-diacetylorthanilamide, M.P. 199–200° C.

B.—*3-methyl-7-chloro-1,2,4-benzothiadiazine-1,1-dioxide*

To a mixture of 3.0 g. of NN'-diacetylorthanilamide and 20 ml. of acetic acid is added a previously prepared solution of 1.5 g. of chlorine in 31 cc. of acetic acid. The reaction mixture is allowed to stand at room temperature for 3 hours and is then evaporated to dryness on a steam bath under reduced pressure. The resulting solid residue is recrystallized from ethanol, yielding the intermediate NN'-diacetyl-2-sulfamyl-4-chloroaniline. The intermediate compound is fused in an oil bath at 250–260° C. for 15 minutes, cooled and the product so obtained is crystallized from 80% ethanol yielding 3-methyl-7-chloro-1,2,4-benzothiadiazine-1,1-dioxide, m.p. 330° C.

EXAMPLE 2

*3-ethyl-7-chloro-1,2,4-benzothiadiazine-1,1-dioxide*

A mixture of 1 g. of 2-sulfamyl-4-chloroaniline and 3 ml. of ethyl orthopropionate is heated at 100° C. for 1.5 hours, cooled and filtered. The filtered product is crystallized from aqueous ethanol yielding 3-ethyl-7-chloro-1,2,4-benzothiadiazine-1,1-dioxide as a crystalline solid, M.P. 267–269° C.

EXAMPLE 3

*3-ethyl-6-chloro-1,2,4-benzothiadiazine-1,1-dioxide*

By replacing the 2-sulfamyl-4-chloroaniline of example 2 with an equivalent amount of 2-sulfamyl-5-chloroaniline and following the procedure outlined in example 2 there is produced 3-ethyl-6-chloro-1,2,4-benzothiadiazine-1,1-dioxide.

EXAMPLE 4

*3-n-propyl-6-trifluoromethyl-1,2,4-benzothiadiazine-1,1-dioxide*

A mixture of 2.0 g. of 3-amino-4-sulfamylbenzotrifluoride and 5 ml. of ethyl orthobutyrate is heated at 100° C. for 1.5 hours. The reaction mixture is cooled, filtered and the filtered product crystallized from aqueous ethanol yielding 3-n-propyl-6-trifluoromethyl-1,2,4-benzothiadiazine-1,1-dioxide as a crystalline solid.

EXAMPLE 5

*3-isopropyl-7-bromo-1,2,4-benzothiadiazine-1,1-dioxide*

A mixture of 3.0 g. of 2-sulfamyl-4-bromoaniline and 10 ml. of ethyl orthoisobutyrate is heated at 100° C. for 1.5 hours. The reaction mixture is cooled and filtered. The filtered product is crystallized from aqueous ethanol yielding 3-isopropyl-7-bromo-1,2,4-benzothiadiazine-1,1-dioxide as a crystalline solid.

EXAMPLE 6

*3-methyl-6,7-dichloro-1,2,4-benzothiadiazine-1,1-dioxide*

Mix 63 g. of benzyl chloride, 38 g. of thiourea, 3 drops of concentrated ammonium hydroxide solution, and 250 ml. of 95% ethanol. Reflux the mixture for 3 hours. Cool and add a solution containing 113 g. of 2,4,5-trichloronitrobenzene in 200 ml. of ethanol. Heat the mixture to reflux and then add dropwise a solution of 70 g. of potassium hydroxide in 500 ml. of ethanol. Continue refluxing for 2 hours, and then cool and filter the solids produced. Wash the solid with aqueous ethanol and dry. There is thus produced 2-benzylthio-4,5-dichloro-nitrobenzene. Suspend 50 g. of 2-benzylthio-4,5-dichloro-nitrobenzene in 1000 ml. of 33% aqueous acetic acid. Bubble chlorine gas through the suspension during a period of 2 hours, while maintaining the suspension at a temperature in the range of about 0–5° C.

Extract the mixture 3 times with 400 ml. each of chloroform, pool the extracts, and wash the chloroform solution with water. Dry the chloroform solution with anhydrous sodium sulfate and filter.

Evaporate the dried chloroform solution to a residue, add to the residue 400 ml. of liquid ammonia, stir and allow the excess ammonia to evaporate, triturate the residue with hexane to form a crystalline solid, continue trituration with water, and filter the solid to yield substantially pure 2 - sulfamyl - 4,5-dichloro-nitrobenzene. Recrystallize from aqueous methanol. Mix together 4.4 g. of ammonium chloride, 18 ml. of methanol, 9 ml. of water and 3.0 g. of 2 - sulfamyl - 4,5-dichloro-nitrobenzene. Heat the mixture to reflux. Add portionwise 4.4 g. of iron filings during a period of about 1½ hours. Cool the mixture and filter. Concentrate the filtrate to a residue. Triturate the residue with 15 ml. of water and filter the solid. Recrystallize the solid from aqueous methanol to yield substantially pure 2 - sulfamyl-4,5-dichloroaniline.

Heat a mixture of 6 g. of 2 - sulfamyl-4,5-dichloroaniline and 15 ml. of ethyl orthoacetate at 100–110° C. for 1.5 hours. Cool and filter the solids. Recrystallize from aqueous ethanol yielding 3 - methyl - 6,7-dichloro-1,2,4 - benzothiadiazine - 1,1 - dioxide. This substance is a white crystalline solid melting at 323–324° C. Infrared analysis of this substance showed the characteristic C=N frequency, confirming that cyclization had occurred.

EXAMPLE 7

*3-cyclopropyl-6,7-dichloro-1,2,4-benzothiadiazine-1,1-dioxide*

A.—*2 - (cyclopropane carbonyl) amino - 4,5 - dichlorobenzene-sulfonamide*

A mixture containing 6.0 g. of 2 - amino-4,5-dichlorobenzenesulfonamide and 15.3 g. of cyclopropane carbonylchloride in 150 ml. of dry benzene is refluxed for 6 hours, cooled and filtered to yield crude 2-(cyclopropane carbonyl) amino - 4,5 - dichloro-benzenesulfonamide.

B.—*3 - cyclopropyl - 6,7 - dichloro - 1,2,4 - benzothiadiazine-1,1-dioxide*

A suspension containing 5.8 g. of 2-(cyclopropane carbonyl) amino - 4,5 - dichloro-benzenesulfonamide in 10 ml. of mineral oil is heated (with stirring) at 225° C. for 30 minutes, cooled and filtered to yield crude 3-cyclopropyl - 6,7 - dichloro - 1,2,4 - benzothiadiazine-1,1-dioxide which is purified by crystallization from methanol.

Some of the modifications of the saturated lower aliphatic hydrocarbon radical in the 3-position and of the X and Y substituents of the benzenoid moiety of tangible embodiments of the invention are illustrated as follows:

The 3 - methyl - 6,8-dichloro compound having a melting point of greater than 350° C.; the 3 - ethyl-6,7-dichloro compound having a melting point 309°–310° C.; the 3 - ethyl-6,8-dichloro compound having a melting point 335°–336° C.; the 3n-propyl-6,7 - dichloro compound having a melting point 305°–308° C.; the 3 - isopropyl - 6,7-dichloro compound having the melting point 338°–339° C.; and 3 - methyl - 6 - trifluoromethyl-7-chloro compound having a melting point 298°–305° C.

EXAMPLE 8

*3,6-dimethyl-7-chloro-1,2,4-benzothiadiazine-1,1-dioxide*

A.—*2-sulfamyl-4-chloro-5-methylaniline*

A mixture of 162.5 ml. of chlorosulfonic acid and 68.3 g. of phosphorus penta-chloride is stirred at 25° C. for one half hour. To this mixture is added 55.2 g. of 2-amino - 4 - methyl - 5 - chlorobenzene sulfonic acid in a portion-wise manner maintaining the temperature at about 15° C. and stirring for one hour. This heated mixture is readily cooled over cracked ice and the precipitate formed is filtered. The filtered product is added to 250 ml. of liquid ammonia. The excess of ammonia is immediately evaporated and the residue is diluted with cold water, filtered and the filtered product is recrystalized from 80% ethanol to yield 2-sulfamyl-4-chloro-5-methylaniline.

B.—*3,6 - dimethyl - 7 - chloro - 1,2,4-benzothiadiazine-1,1-dioxide*

A mixture of 2 g. of 2 - sulfamyl - 4 - chloro-5-methylaniline and 6 ml. of ethylorthoacetate is heated at 100° C. for 1.5 hours. The resulting mixture is cooled and filtered. The filtered product is recrystallized from methyl-alcohol, the product of which is then recrystallized from acetone to yield 3,6 - dimethyl - 7 - chloro-1,2,4-benzothiadiazine - 1,1-dioxide, M.P. 334° C. By replacing the 2 - amino - 5 - chloro - 4 - methylbenzene sulfonic acid employed in step A of this example with an identical quantity of 2 - amino - 4 - chloro-5-methylbenzene sulfonic acid and following the same procedure described in steps A and B of this example, there is obtained 3,7-dimethyl - 6 - chloro - 1,2,4 - benzothiadiazine-1,1-dioxide, M.P. 301–302° C.

It is apparent to a chemist skilled in the art that our novel compounds are acidic in character and, indeed, are soluble in aqueous alkali. The alkali metal salts of our compounds may be prepared by methods well-known in the art for the preparation of a salt of a strong base with a weak acid. Although the alkaline metal salt, as indicated hereinbefore, may be obtained on evaporation of an alkaline solution of a compound of this invention, we prefer to employ non-aqueous media. For example, by mixing together an alcoholic solution of a compound of our invention with an alcoholic solution containing a stoichiometric quantity of an alkali metal alkoxide and after evaporating the solvent, there is obtained the alkali metal salt. In particular, by reacting stoichiometric quantities of 3 - methyl - 6,7 - dichloro - 1,2,4-benzothiadiazine - 1,1-dioxide and sodium methoxide in anhydrous methanol, and evaporating the solvent, there is obtained the sodium salt of 3 - methyl-6,7-dichloro - 1,2,4-benzothiadiazine - 1,1-dioxide as a white solid which is soluble in water.

The manner of using the invention sought to be patented in its process aspect will now be described:

It is well known that diuretics of the chlorothiazine type, i.e., those compounds which differ from the compounds of this invention in that they have a sulfamyl group attached to the benzenoid portion of the nucleus, usually in the 7-position, mildly reduce blood pressure in patients having hypertension. These compounds, however, do not demonstrate this activity under normotensive conditions. Quite unexpectedly, we have discovered that the tangible embodiments of this invention exhibit blood pressure lowering activity despite the fact that they possess no significant diuretic activity. Indeed, not only are the compounds non-diuretic, but in some instances they may have anti-diuretic effects.

It appears the anti-hypertensive action of our compositions does not depend upon diuresis, ganglionic blockade, or adrenergic blockade, but rather our compositions appear directly to affect that part of the vascular system which is deranged in hypertension, i.e. the peripheral vasculature. Hence, our compositions are what may be termed as "true" antihypertensives, and as such, are useful as valuable therapeutic agents for the alleviation and control of essential hypertension, malignant hypertension, and the like, and peripheral vascular disorders, e.g. Buerger's disease, Raynaud's disease, etc., angina pectoris, and the like.

The toxicity of the compounds was first evaluated in mice and then in dogs with favorable results. By standard pharmacological evaluation procedures, the antihypertensive activity of the compounds was determined in dogs.

From our tests, we have found that our compounds will lower blood pressure in both normotensive and hypertensive dogs, the action in hypertensive dogs being slow in its onset and of long duration. Likewise, our compounds will also antagonize blood pressure responses to such well-known pressor agents as epinephrine, norepinephrine, and angiotensin. This antagonism, it should be noted, functions without any particular specificity, but rather the effect is general to the class of compounds functioning as pressor agents. A further property exhibited by our compositions is that they will significantly increase peripheral and coronary blood flow.

The effective dosage of the compounds of this invention depends upon the severity, the stage, and the individual characteristics of each case and will be determined by an attending physician. Generally, a dosage range of from 0.25 to about 15.0 mg. per kg. of body weight per day constitutes the overall range, with a range of about 0.25 to 5 mg. per kg. per day for the preferred compounds. Specifically, the following represents acceptable total daily doses for 3-methyl-6,7-dichloro-1,2,4-benzothiadiazine-1,1-dioxide, 0.5 to 5 mg. per kg.;

3-ethyl-6,7-dichloro-1,2,4-benzothiadiazine-1,1-dioxide, 0.5 to 5 mg. per kg.;

3-n-propyl-6,7-dichloro-1,2,4-benzothiadiazine-1,1-dioxide, 1 to 10 mg. per kg.;

3-methyl-6-trifluoromethyl-7-chloro-1,2-benzothiadiazine-1,1-dioxide, 0.25–2.5 mg. per kg.;
3-methyl-7-chloro-1,2,4-benzothiadiazine-1,1-dioxide, 0.5–5 mg. per kg.;
3-ethyl-7-chloro-1,2,4-benzothiadiazine-1,1-dioxide, 0.5–5 mg. per kg.;
3-methyl-6-chloro-1,2,4-benzothiadiazine-1,1-dioxide, 1–10 mg. per kg.;
3-ethyl-6-chloro-1,2,4-benzothiadiazine-1,1-dioxide, 0.5–5 mg. per kg.;
3-n-pentyl-6-chloro-1,2,4-benzothiadiazine, 1-dioxide, 1–10 mg. per kg.;
3-cyclopropyl-6-chloro-1,2,4-benzothiadiazine-1,1-dioxide, 0.25–2.5 mg. per kg.;
3-n-butyl-7-chloro-1,2,4-benzothiadiazine-1,1-dioxide, 2–20 mg. per kg.;
3-methyl-6-trifluoromethyl-1,2,4-benzothiadiazine-1,1-dioxide, 0.25–2.5 mg. per kg.;
3-ethyl-6-trifluoromethyl-1,2,4-benzothiadiazine-1,1-dioxide, 0.25–2.5 mg. per kg.;
3,6-dimethyl-7-chloro-1,2,4-benzothiadiazine-1,1-dioxide, 2–20 mg. per kg.;
3,7-dimethyl-6-chloro-1,2,4-benzothiadiazine-1,1-dioxide, 2–20 mg. per kg.

The compounds of our invention may be used in the form of pharmaceutical preparations which contain the active ingredient in admixture with a pharmaceutical carrier suitable for entral or parenteral administration. Such preparations may be in solid forms, as, for example, tablets, capsules and suppositories, or in liquid forms, as for example, elixirs, emulsions and injectables.

In the formulation of pharmaceutical preparations there can be employed such substances which do not react with the active substances, for example, water gelatin, lactose, starches, magnesium stearate, calcium carbonate, talc, vegetable oils, benzyl, alcohols, gums, polyalkylene glycols, and petroleum jelly. The active ingredient is preferably present in the preparation in such proportions by weight that the proportion by weight of active ingredient in the formulation to be administered lies between 0.1% and 50%.

In addition to the above enumerated excipients which are incorporated into the compositions of this invention, in some instances (here again, depending upon the individual characteristics of the host, the severity of the malady being treated, potency of active ingredient, etc.) an additional active ingredient may be indicated. For example, in some instances, it may be advantageous to incorporate with the compounds of this invention a therapeutically effective quantity of a diuretic.

EXAMPLE 9

*Table formulation*

The following formulation provides for the manufacture of 1000 tablets:

| | Grams |
|---|---|
| (1) 3 - methyl - 7-chloro-1,2,4-benzothiadiazine-1,1-dioxide | 25 |
| (2) Lactose, U.S.P. | 181 |
| (3) Corn starch, U.S.P. | 92.5 |
| (4) Magnesium stearate | 1.5 |

Thoroughly granulate a mixture of 72.5 g. of corn starch and the lactose with a paste prepared by dissolving 20 gm. of corn starch in 100 ml. of hot distilled water. Dry the resulting granulation at 40–45° C. and pass it through a No. 16 mesh screen. To the dried, screened granulation add a blended mixture of the active ingredient (1) and the magnesium stearate. Thoroughly blend and then press into tablets of 300 mg. each.

EXAMPLE 10

*Capsule formulation*

The following formulation provides for the manufacture of 1000 capsules:

| | Grams |
|---|---|
| (1) 3 - methyl - 7 - chloro-1,2,4-benzothiadiazine-1,1-dioxide | 25 |
| (2) Lactose | 273.5 |
| (3) Magnesium stearate | 1.5 |

Mix active ingredient (1) with the lactose and blend in the magnesium stearate. Fill hard gelatin capsules with 300 mg. each of the blended mixture to produce capsules containing 25 mg. of 3 - methyl - 7-chloro-1,2,4-benzothiadiazine-1,1-dioxide.

EXAMPLE 11

*Parenteral formulation*

The following formulation provides for the manufacture of 1000 vials each containing 10 mg. of active ingredient, as its sodium salt:

| | | |
|---|---|---|
| (1) 3 - methyl - 7-chloro-1,2,4-benzothiadiazine-1,1-dioxide sodium salt | gm | 10.95 |
| (2) Monobasic potassium phosphate | gm | 6.0 |
| (3) Water for injection, U.S.P.q.s. | l | 1.0 |

Dissolve ingredients (1), (2), and (3) in approximately 80 percent of the volume of water and filter the resulting solution. Add to the filtrate sufficient water to make to a 1000 ml. volume. Sterile-filter the solution and aseptically fill one milliliter portions of the so-prepared solution into two milliliter vials then lyophilize. After the lyophilized cake is dry, aseptically stopper the vials with rubber plugs and seal.

In addition to the anti-hypertensive activity described for the compounds of this invention, it has also been found that these compounds have valuable application as agents in the control of hypoglycemia. Pharmacological evaluation was carried out in mice to determine the hyperglycemic activity of these compounds wherein the effect on the blood-glucose level of the test animal is determined from a blood sample taken (from the infra-orbital sinus) at one and three hours after drug administration. From the results of these tests, it is determined that significant hyperglycemic effects are produced which render these compounds useful in therapeutic application. The foregoing results were confirmed clinically; a summary of a clinical history being as follows:

A four year old whilte male, experienced his first hypoglycemic seizure at five months of age. Following numerous seizures, a partial pancreatectomy was carried out at seven months of age with no clinical improvement. A diagnosis of leucine-sensitivity was made at ten months of age. Therapy with ACTH, corticosteroids, testosterone, and human growth hormone produced little or no sypmtomatic or biochemical improvement. The most satisfactory therapy prior to the use of 3-methyl-7-chloro-1,2,4-benzothiadiazine-1,1-dioxide had been dietary management, using a diet low in leucine and total protein and high in carbohydrate. It was necessary to feed the patients 5 $_4$ 6 times daily. In addition he was treated with anticonvulsants, and crystalline glucagon was used for the therapy of acute hypoglycemic attacks. Despite this management, the patient's blood sugars varied from 20–40 mg. % with little elevation following meals. The patient's I.Q. was between 50–60.

The patient received two courses of therapy with 3-methyl - 7-chloro-1,2,4-benzothiadiazine-1,1-dioxide, each approximately three weeks in duration. Control observations were made for several days before and after 3-methyl - 7-chloro-1,2,4-benzothiadiazine-1,1-dioxide therapy. Throughout both control and treatment periods the patient's diet remained constant.

He was initially started on 3-methyl-7-chloro-1,2,4-benzothiadiazine-1,1-dioxide solution by mouth at a dose of 1 mg./kg. This was increased to 4 mg./kg. given three times daily, before a hyperglycemic effect was regularly noted. While on 3-methyl-7-chloro-1,2,4-benzothiadiazine-1,1-dioxide, a marked improvement was noted in the patient's appetite, his physical activity, and general responsiveness to his environment. His blood sugars following food ingestion were markedly increased over the control levels, but frequently fell to hypoglycemic levels 4-5 hours after meals. These blood sugar falls were never associated with hypoglycemic symptoms while on 3-methyl-7-chloro-1,2,4-benzothiadiazine-1,1-dioxide. The patient tolerated a 26 hour fast without symptoms while receiving 3-methyl-1-chloro-1,2,4-benzothiadiazine-1,1dioxide. Discontinuation of 3-methyl-7-chloro-1,2,4-benzothiadiazine-1,1-dioxide after three weeks treatment resulted in a return to blood glucose levels in the hypoglycemic range within 24-36 hours. On re-introducing therapy at 4 mg./kg. increased blood sugar levels appeared after the first meal, approximately fourteen hours after the initial dose.

In addition to repeated general physical examinations, the patient was carefully followed by complete blood chemistries, blood counts, and urinalysis. Glycosuria occurred on only one occasion. The blood sugar at that time was 220 mg. %, one hours after a meal. He was receiving 5 mg./kg. three times daily at that time. On decreasing the dose, the glycosuria promptly disappeared. No clearly adverse effects of the drug have been seen in this patient after six weeks of therapy. The weight loss reported after the second course of treatment may have been due to increased and normalized physical activity under 3 - methyl-7-chloro-1,2,4-benzothiadiazine-1,1dioxide. His diet remained as restricted as during the control period which was characterized by a minimum of physical activity.

The acute studies reported here on a single patient with leucine-sensitive hypoglycemia demonstrate the regularly reproducible hyperglycemic effect of 3-methyl-7-chloro-1,2,4-benzothiadiazine-1,1-dioxide when given in an appropriate dose.

We claim:
1. A 1,2,4-benzothiadiazine-1,1-dioxide selected from the group consisting of the formula:

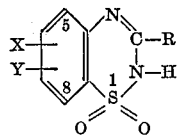

and the tautomers and non-toxic alkali metal salts thereof, wherein R is a member of the group consisting of lower alkyl, cyclopropyl, cyclobutyl and cyclopentyl; X is a member of the group consisting of halogen and trifluoromethyl located at positions of the group consisting of 6 and 7; and Y is a member of the group consisting of hydrogen, halogen, trifluoromethyl and lower alkyl located at one of the unsubstituted positions of the group consisting of positions 6, 7 and 8.

2. A compound of claim 1 wherein X is halogen and Y is hydrogen and R is lower alkyl.

3. A compound of claim 1 wherein X is a halogen, Y is lower alkyl and R is lower alkyl.

4. A compound of claim 1 wherein X is halogen, Y is halogen and R is lower alkyl.

5. A compound of claim 1 wherein X is trifluoromethyl, Y is hydrogen and R is lower alkyl.

6. A compound of claim 1 wherein R is methyl, X is 7-chloro, and Y is hydrogen, said compound being 3-methyl-7-chloro-1,2,4-benzothiadiazine-1,1-dioxide.

7. A compound of claim 1 wherein R is cyclopropyl, X is 7-chloro and Y is hydrogen, said compound being 3-cyclopropyl-7-chloro-1,2,4-benzothiadiazine-1,1-dioxide.

8. A compound of claim 1 wherein R is methyl, X is 6-chloro and Y is 7-chloro, said compound being 3-methyl-6,7-dichloro-1,2,4-benzothiadiazine-1,1-dioxide.

9. A compound of claim 1 wherein R is methyl, X is 6-methyl and Y is 7-chloro, said compound being 3,6-dimethyl-7-chloro-1,2,4-benzothiadiazine-1,1-dioxide.

References Cited

UNITED STATES PATENTS 2,986,573  5/1961  Topliss et al. _____ 260—243

NICHOLAS S. RIZZO, *Primary Examiner.*